(12) United States Patent
Robins et al.

(10) Patent No.: US 6,398,902 B1
(45) Date of Patent: Jun. 4, 2002

(54) METHOD OF END BONDING TUBULAR SECTIONS AND BONDING A FLANGE ON THE END OF TUBULAR SECTIONS

(75) Inventors: Brian Robins, Tracy; John Kesapradist, Santa Clara, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/503,374

(22) Filed: Feb. 14, 2000

(51) Int. Cl.[7] .............................................. B29C 65/00
(52) U.S. Cl. ............................ 156/304.2; 156/304.3; 156/503; 156/509
(58) Field of Search .................... 156/304.1, 304.2, 156/304.3, 304.6, 502, 503, 509

(56) References Cited

U.S. PATENT DOCUMENTS

| | | | | |
|---|---|---|---|---|
| 4,801,349 A | * | 1/1989 | Dommer et al. ............ 156/503 |
| 4,876,041 A | * | 10/1989 | Hanselka ...................... 264/25 |
| 4,923,540 A | * | 5/1990 | Born et al. .................... 156/86 |
| 5,037,500 A | * | 8/1991 | Hilpert ........................ 156/503 |
| 5,223,189 A | * | 6/1993 | Friedrich ..................... 264/31 |
| 5,328,648 A | * | 7/1994 | McBrien et al. .............. 264/35 |
| 5,786,054 A | * | 7/1998 | Platusich et al. ........ 428/36.91 |
| 6,236,026 B1 | * | 5/2001 | Schafstein et al. .......... 219/535 |

* cited by examiner

Primary Examiner—James Sells
(74) Attorney, Agent, or Firm—Perman & Green, LLP

(57) ABSTRACT

A tool and related method uses an insert for lap splicing two end to end connected tubes to one another. The insert is formed from plurality of members which together are receivable into the internal size and shape of the internal tubular member. The insert can be pulled out of the tubular members once the lap joint is formed. The invention also resides in a tool which locates a flange onto the outside surface at the end of the tubular member to effect registration of it in a flush and perpendicular manner.

18 Claims, 5 Drawing Sheets

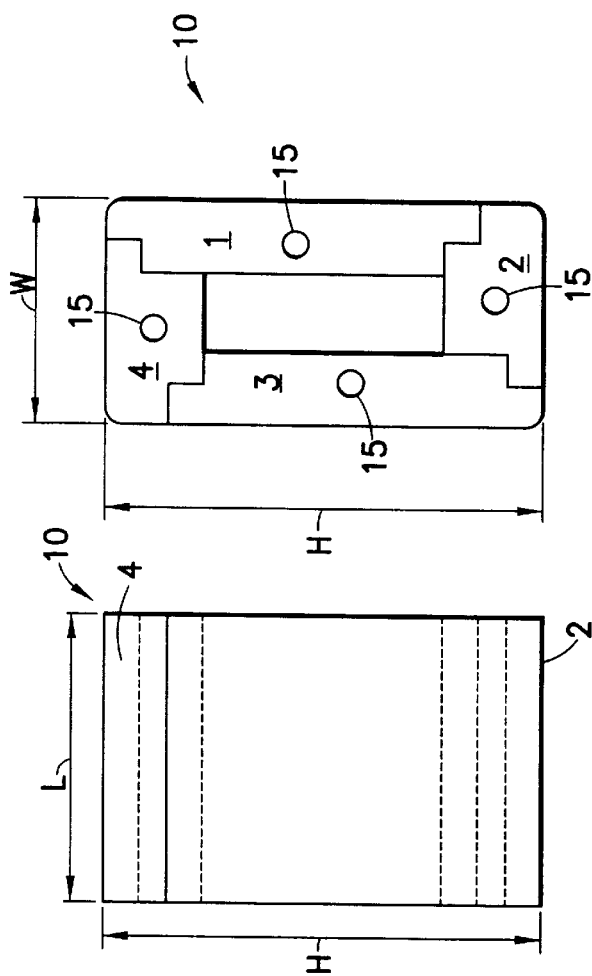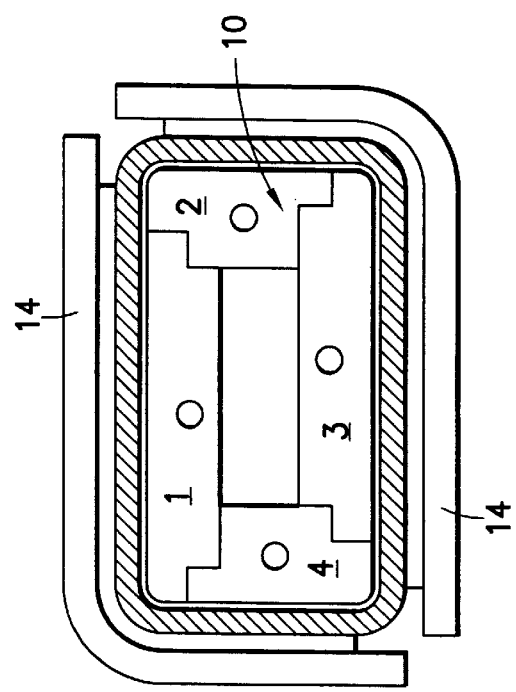

METHOD OF END BONDING TUBULAR SECTIONS AND BONDING A FLANGE ON THE END OF TUBULAR SECTIONS

BACKGROUND OF THE INVENTION

1. Field of the Invention

The present invention relates to an improvement in waveguide fabrication, and relates more particularly to an improved method of connecting end to end placed tubular members as well as improvements in connecting a waveguide tubular member perpendicularly to an end flange.

High power multi-carrier microwave space antenna waveguides are important to the communication capability of a satellite which is oribiting the earth. Conventional waveguides are hollow tubes made preferably from a graphite composite and are subsequently metal plated to effect electrical conductivity. Usually the plating used is copper or silver.

The process of launching satellites into space involves a very weight conscious process. It has been calculated that the cost for launching a pound of payload material into space is on the order of many thousands of dollars. Therefore, it is incumbent upon satellite manufacturers to use materials which are light weight, yet function with equal effectiveness as conventional metals such as aluminum. Thus, the use of graphite composite or other composite materials in the fabrication of waveguides has evolved as a standard practice. However, the fabrication of joints using composite materials which require exacting standards is problematic given that processes, such as, milling or machining, are not usually part of composite joint construction.

Accordingly, it is an object of the present invention to provide a method and tool for aligning tubular members used as waveguides in a satellite and connecting same with exacting tolerance.

It is a further object of the invention to provide a method for connecting the end of a tubular waveguide to a waveguide mounting flange at a perpendicular angle with repeatable accuracy.

A further object of the invention is to provide a continuous free path of conduction within the metal plated waveguide that does not allow RF energy within the waveguide to leak out.

Still a further object of the invention is to provide a method and apparatus which overcomes edge effects at waveguide ends due to bowing of the walls by keeping the cross section of the tubular members at the required dimensions during bonding.

Still a further object of the invention is to provide a tool which is readily removable and requires minimum work once bonding is complete for removal.

Yet still a further object of the invention is to keep excess adhesive on the inside of the waveguide contained close to the inner wall in the embodiment of the butt joint connection.

Still a further object of the invention is to provide tooling which is extracted from the waveguides using readily available means such as string.

Still yet a further object of the invention is to overcome the other problems known with edge effects at waveguide ends by keeping the cross section of the tubular members at required dimensions during bonding.

SUMMARY OF THE INVENTION

The invention resides in a method of connecting two tubular members in an end to end manner each having an internal confine extending in a longitudinal direction, wherein the method comprises the steps of: providing a tool correspondingly sized and shaped to fit within the hollow tubular confine of each of the tubular members; positioning the tool between the opposed ends of each tubular member such that a portion of the tool extends into one tubular member and portion of the tool extends into the other tubular member thereby bridging the two tubular members; applying adhesive and an exterior strap or straps between the opposed ends of each of the one and another tubular members and the tool, and constructing the tool from a material which does not adhere, or covering the tool with a material which does not adhere, to the adhesive used in forming the joint.

Ideally, the step of positioning the tool between the opposed ends of the tubular members further includes the step of first positioning the tool within one end of the one tubular member such that a portion of the tool extends outwardly therefrom and telescoping the other of the tubular members over the portion of the tool extending outwardly from the one tubular member and abutting the juxtaposed edges of the ends of the tubular members with one another.

Desirably, the tool is provided as a plurality of interconnected parts to make up a rectangular solid by providing each of the plurality of interconnected parts with longitudinally extending mating members which ate correspondingly sized and shaped to fit within corresponding members formed on the part to which one part is connected.

The step of providing the tool as a plurality of interconnected parts includes the step of connecting each of the plurality of parts making up the tool with a string or other connecting device and connecting at least two of the plurality of parts with the string in opposite directions within each of the tubular members and waiting for the adhesive to cure and thereafter pulling each of the strings apart from the outside end of the members to disassemble the tool from the connection joint.

The invention also relates to an apparatus having a central axis for aligning and butt connecting two tubular members to one another and comprises a plurality of parts each of the parts having one side edge and another side edge; the one side edge of one of the parts and the other side edge of the other of the parts having corresponding shaped portions which interfit and correspond to the height or width of the tubular member and are laterally slidable relative to one another such that when the one side edge and the other side edge of the parts are placed together the tool has a closed shape; and wherein the correspondingly shaped portions of the parts of the apparatus extend parallel to the central axis of the tool such that the parts slide relative to one another axially.

The invention further resides in a method of mounting and bonding a flange to a tubular member comprising the steps of: providing a tool having a base plate having an accurately formed top surface and a central point thereon; providing an insert correspondingly sized and shaped to be closely received within the inner confine of the tubular member; securing the flange to the base plate at a predetermined location relative to the central point thereon; providing the flange such that it has an inner surface which comes into contact with the tubular member outer surface; locating the insert within the tubular member and securing the insert to the base plate relative to the central point and applying adhesive between the flange inner surface and the tubular member outer surface in order to bond the surfaces together.

The invention also resides in an apparatus for locating a flange on a tubular member comprising: a base plate having a center; a plurality of primary holes formed geometrically about the center; the base plate having a plurality of secondary holes formed radially outwardly of the center beyond the primary holes; the secondary holes corresponding to the position of holes in a flange to be connected to a tubular member; an insert having a shape corresponding in size and shape to that of the interior surface of the tubular member; and the insert being located by some means (e.g. a hole) such that the central axis of the insert corresponds to the central point on the base plate.

BRIEF DESCRIPTION OF THE DRAWINGS

FIG. 1 is a vertical sectional view of the butt joint tool of the first embodiment taken through line 1—1 of FIG. 4.

FIG. 2 is a side elevation view of the tool shown in FIG. 1.

FIG. 3 shows an end view of the tool shown in FIG. 2 fabrication.

DETAILED DESCRIPTION OF THE PREFERRED EMBODIMENT

As seen in FIGS. 1–4 the butt joint alignment and bonding tool illustrated generally as 10 is shown. As seen in FIG. 3, the tool 10 has four interfitted parts labeled respectively 1, 2, 3 and 4. These parts when fitted together create a generally solid rectangular shape which is sized and shaped to fit within the correspondingly sized and shaped interior confine of two tubular members 12, 12' which are to be butt joined together. The tool 10 has approximately the same outer dimensions as the inner dimensions of the tubular confines of the tubular members, but is about 0.001 to 0.002 inch smaller on each height H and width W dimension as defined in FIG. 3 to allow for easy installation and removal of tool 10. The parts 1–4 are made of Delrin, Teflon or other adhesive non-bonding material that will not scratch or mar the internal surfaces of the tubular member illustrated as 12, and 12', or is coated or covered with such a non-bonding material.

Each of said plurality of interconnected parts 1–4 has longitudinally extending complimentary mating side edge portions which are correspondingly sized and shaped to fit within a corresponding portion formed on the part to which the other part is mated. In this way, the tool maintains a generally rectangular shape, but is capable of disassembly by sliding one or more of the parts 1–4 axially relative to the others.

Figure 4:
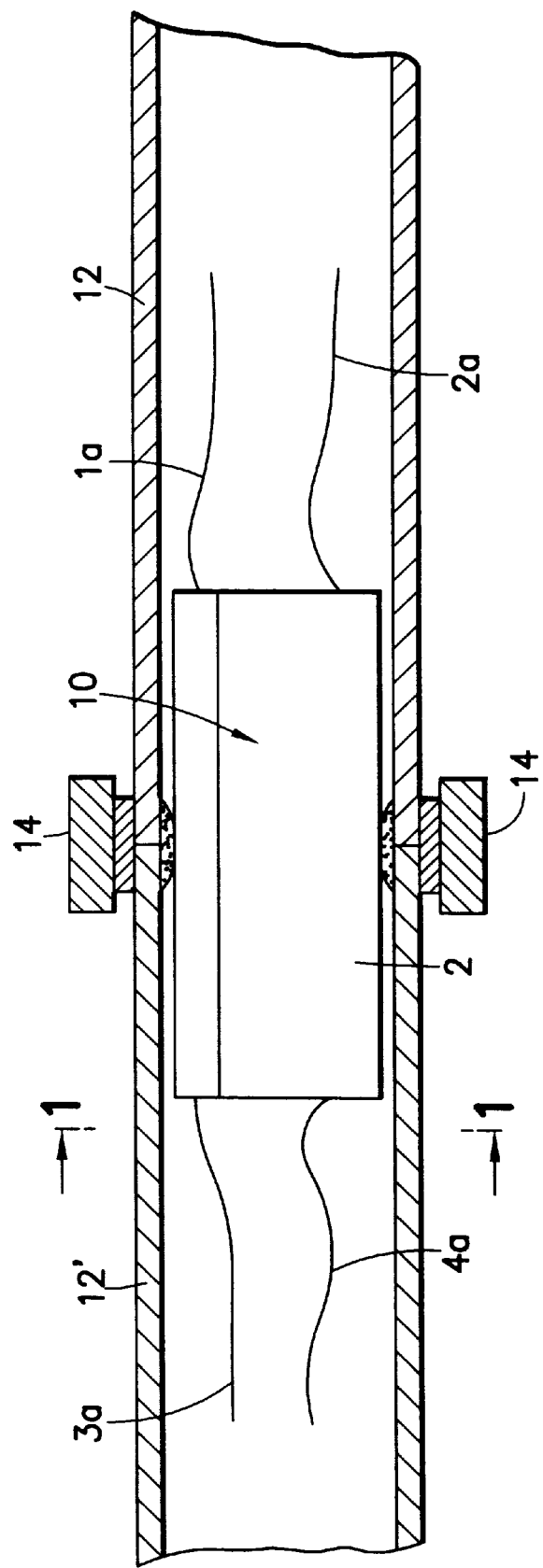
FIG. 4 is a vertical sectional view through the waveguide showing the tool during assembly.

The tool 10 is used to assemble the joint as illustrated in FIG. 4 such that corresponding waveguide pieces 12, 12' fit together. Once the waveguide has been assembled, the tool 10 is removed. To form the assembly of the waveguide, the tool 10 is first placed half way in and half way out of one of the waveguide tubular members 12, 12'. The second waveguide tubular member is placed over the outwardly extending portion of the tool. Sections of the waveguides 12, 12' are butt joined together. Splice straps 14,14 are bonded over the joint using clamps to apply pressure. After the adhesive is cured the tool 10 is removed by pulling the tool apart from either end zusing release devices preferably attached to each part 1–4 of the tool, for example, strings or other similar devices 1a, 2a, 3a and 4a, respectively, that are connected to each part 1–4 through holes 15.

More specifically, the tool 10 is positioned within and between the waveguide tubular parts 12,12' and adhesive is applied at the gap between the two sections. Since the tool 10 occupies the void between the butt joint sections 12, 12', adhesive completely fills the gap without voids and without dripping or creating excesses that will change the internal dimensions of the waveguide. Since the tool is made of or covered with a non-bonding material, the adhesive will not attach to it. The two sections 12,12' are kept in proper alignment by virtue of the tool 10 being held within the joint acting as would a splice. The distance between the two sections 12,12' can be controlled and remains minimal and consistent. The tool 10 in this capacity further straightens any bowing of the walls of the tube at the edges to maintain the desired dimensions during bonding. Any excess adhesive squeezed between the tube and the tool forms a film of approximately 0.001 inch or less, which will not compromise internal dimensions of the waveguide once coated, usually with a metallic material. Thus, interruption of electrical conductivity at the joint is eliminated. It was found in prior productions without such a tool that one or more coatings of silver filled adhesive on the outside of the joint was required to eliminate RF leakage followed by the coating of another adhesive to contain the silver adhesive. This practice is now obviated by the method of the present invention, which completely seals the joint preventing any RF leakage.

Figure 5:
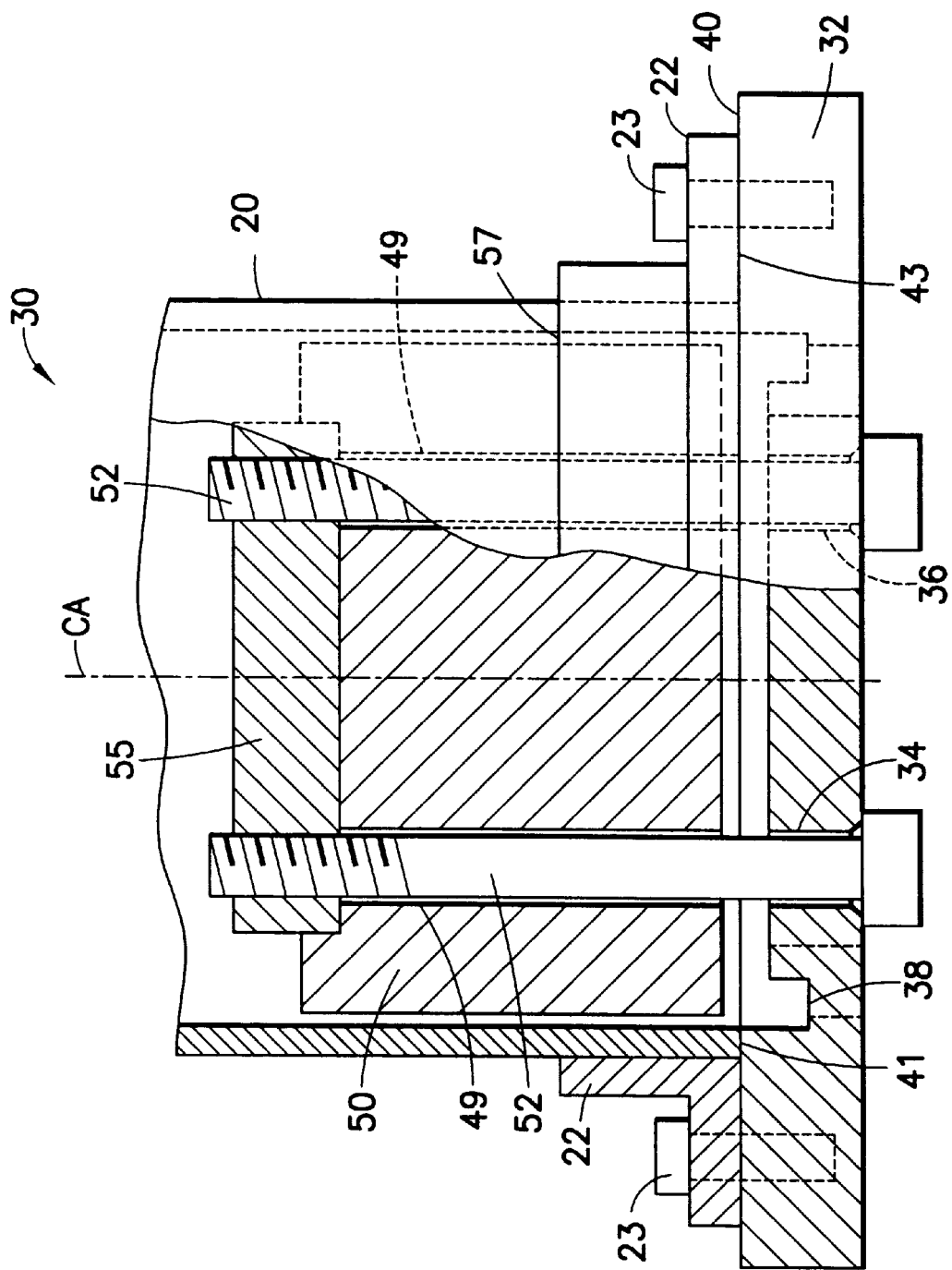
FIG. 5 is an assembly view of the joint of the second embodiment.
Figure 6C:
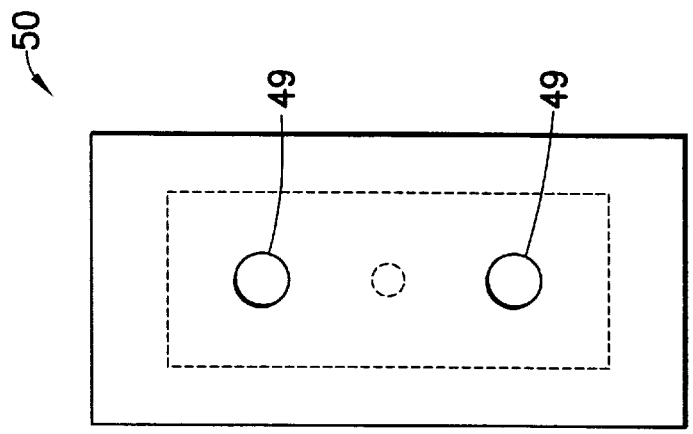
FIGS. 6a, 6b and 6c are respectively a bottom view, a vertical section view and a top view of the waveguide insert.
Figure 6B:
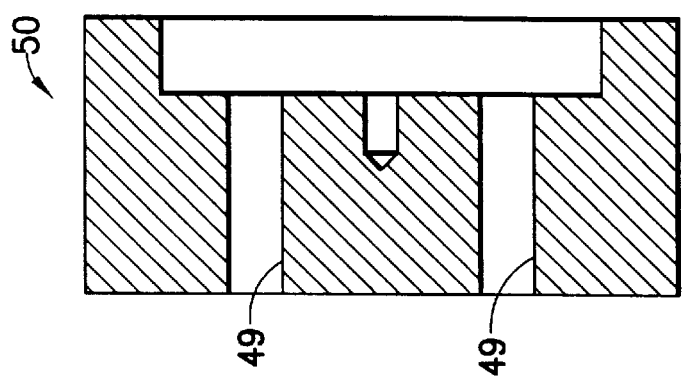
Figure 6A:
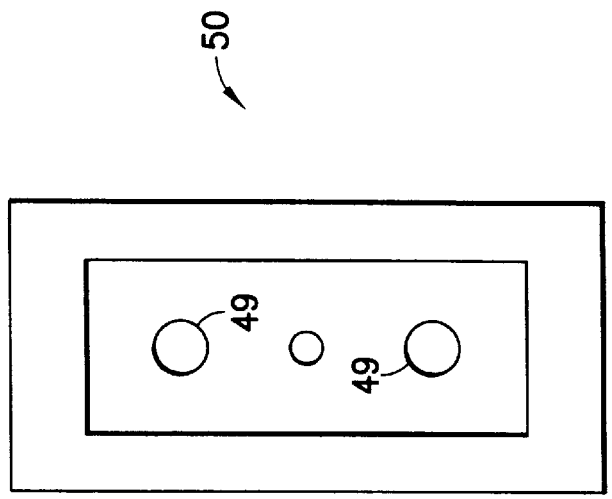
Figure 7:
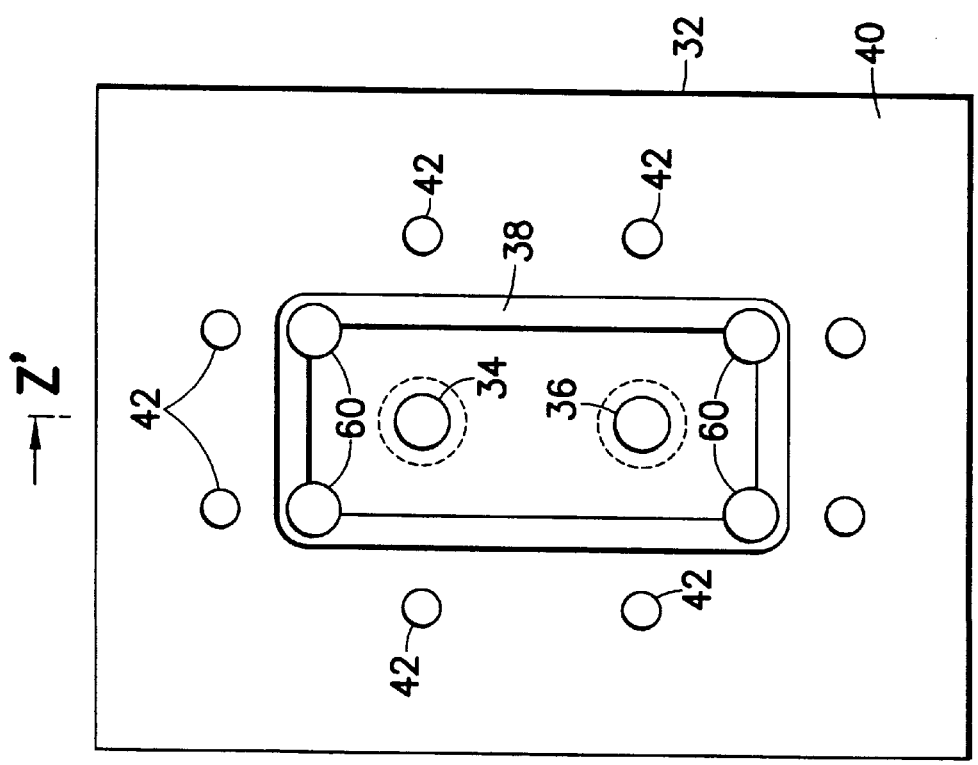
FIG. 7 is a top plan view of the base plate of the connection of the second embodiment of the invention.

Referring now to FIGS. 5–7, it should be seen that a waveguide tube illustrated as 20 in FIG. 5 is adhesively bonded to a mounting flange 22 in a perpendicular manner. For this purpose, a tool 30 is provided and includes a base plate 32 having drilled holes 34 and 36 formed therein and a rectangular well 38 formed concentrically around the two holes 34 and 36. The base plate 32 has an accurately formed top surface 40 which provides a support against which the end edge 41 of the waveguide tube is supported.

As shown in FIG. 7, the base plate 32 also has a plurality of mounting holes 42,42 surrounding the central openings 34 and 36. These mounting holes are provided for securing the flange 22 to the base plate in the manner illustrated in FIG. 5.

The tool 30 further has an insert part 50 which is inserted at the end of the waveguide tube proximate the base next to the end edge 41. The insert part 50 has two through holes 49,49 through which are received bolts 52,52 which thread into a compression plate 55 located on the top surface of the insert part 50.

The co-action between the bolts 52,52 located in the insert part 50 and in the through holes 49, 49 is caused by the bolts acting against the base plate 32 through the holes 34, 36 to draw the waveguide tube and insert 50 in toward the base plate 32 and maintain same in a perpendicular relationship thereto. The insert part 50 has substantially the same outer diameter, less 0.001 to 0.002 or smaller, as the internal dimensions of the waveguide tube 20. The insert is made of Delrin or Teflon, or other non-bonding material or coated or covered with a non-bonding material that will not scratch or mar internal surfaces of the waveguide and will not become affected by adhesive which may ooze from the joint during fabrication.

Figure 8:
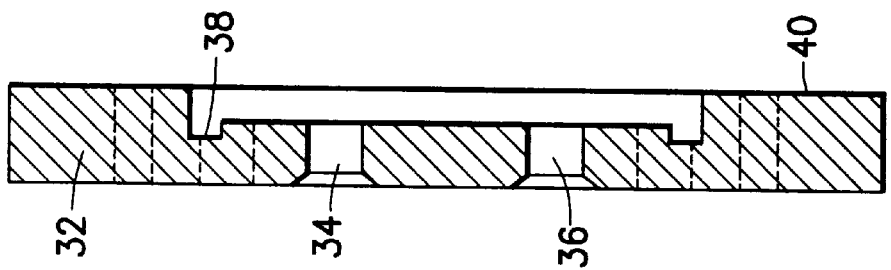
FIG. 8 is cross sectional view through the base plate taken through line Z-Z' of FIG. 7.

The base plate 32 is a flat member made of a metal or other hard material. The mounting flange 22 to be bonded to the waveguide tube 20 is first connected to the base plate 32 of the tool 30 using mounting screws 23,23. The waveguide tube 20 is placed over the insert part 50 and then the insert part 50 of the tool 30 is then installed on the base plate 32 via bolts 52, 52 through holes 49, 49 of the insert and holes 34, 36 of the base plate and screwed into compression plate 55. Adhesive is at some point applied to the outer surface of the waveguide tube 20 proximate the end 41 and to the inner surface of the flange 22. In this way, the flange 22 and the waveguide tube 20 will be aligned with the central axis CA such that the flange 22 rests flat and perpendicular to the waveguide tube 20 and the edge 41 of the waveguide tube lies flush with the end face 43 of the flange on the top surface 40 of the base plate 32. The flange is bonded in one operation and kept perpendicular without any post bonding machining. The tool 30 furthermore straightens any bowing of the walls of the waveguide tube at the edge to maintain the dimensions during bonding. Any excess adhesive that squeezes between the waveguide tube 20 and the insert part 50 will form a film of about 0.001 inch or less which will not compromise the internal dimensions. To these ends, it should also be seen that the base plate 32 further has a rectangular well 38 cut into the tool support surface 40 to receive excess adhesive flowing from the joint. Also, as illustrated in FIGS. 7 and 8, the well 38 has through holes 60 in each corner provided for receiving excess adhesive which will flow downwards between the flange and the waveguide wall, and eliminating said excess adhesive through the holes 60.

The insert part 50 is thus caused to be drawn towards the base plate 32 through the intermediary of the take-up bolts 52,52 when tightened. In so doing, the end 41 of the waveguide tube 20 is caused to be drawn against the tooled surface 40 of the base plate 32 by the compressive action of the bolts 52,52 drawing it into engagement with the accurately flat surface 40 while the adhesive cures. Thus the end 41 of the waveguide tube 20 is bonded flush with the perpendicular surface of flange 22. Thereafter, the mounting screws 23,23 are unthreaded from the plate 32 and the bolts 52, 52 are removed from the tool 30 and the base plate 32 and insert 50 are separated and removed from the now adhesively bonded flange 22 and waveguide tube 20.

Accordingly, the invention has been described by way, of illustration rather than limitation.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of connecting two tubular members in an end to end manner each having an internal confine extending in a longitudinal direction, said method comprising the steps of:
   providing a tool correspondingly sized and shaped to fit within the hollow tubular confine of each of said tubular members;
   positioning said tool between the opposed ends of each tubular member such that a portion of said tool extends into one tubular member and portion of said tool extends into the other tubular member thereby bridging the opposed ends of the two tubular members;
   applying adhesive or resin solely or in combination with a strap to the opposed ends of each of said one and another tubular members while positioned on said tool to join the opposed ends together.

2. A method as defined in claim 1 further characterized by constructing said tool from a non-bonding material, or coating or covering said tool with a non-bonding material, such that it will not adhere to the adhesive used in forming the joint.

3. A method as defined in claim 2 further characterized by said step of positioning said tool between the opposed ends of said tubular members further including the step of first positioning the tool within one end of said one tubular member such that a portion of said tool extends outwardly therefrom and telescoping the other of said tubular members over said portion of said tool extending outwardly from the one tubular member and abutting the juxtaposed edges of the ends of said tubular members with one another.

4. A method of connecting two tubular members in an end to end manner each having an internal confine extending in a longitudinal direction, said method comprising the steps of:
   providing a tool correspondingly sized and shaped to fit within the hollow tubular confine of each of said tubular members said tool being constructed from a non-bonding material, or coated or covered with a non-bonding material, such that it will not adhere to an adhesive used in forming a joint;
   positioning said tool between the opposed ends of each tubular member and portion of said tool extends into the other tubular member thereby bridging the opposed ends of the two tubular members, said step of positioning said tool between the opposed ends of said tubular members further including the step of first
   positioning the tool within one end of said one tubular member such that a portion of said tool extends outwardly therefrom and telescoping the other of said tubular members over said portion of said tool extending outwardly from the one tubular member and abutting the juxtaposed edges of the ends of said tubular members with one another;
   applying adhesive or resin in combination with a strap to the opposed ends of each of said one and another tubular members while positioned on said tool to join the opposed ends together, wherein the strap is applied about an adhesive seam formed between the abutting end edges of the tubular members.

5. A method as defined in claim 4 further characterized by providing said tool as a plurality of interconnected parts.

6. A method as defined in claim 5 further characterized by providing said plurality of interconnected parts to make up a rectangular solid.

7. A method as defined in claim 6 further characterized by providing each of said plurality of interconnected parts with longitudinally extending mating members which are correspondingly sized and shaped to fit within corresponding members formed on the part to which one part is connected.

8. A method as defined in claim 7 further characterized by connecting each of said plurality of parts making up said tool to a string or similar device and connecting at least two of said plurality of parts to said string and waiting for said adhesive to cure and thereafter pulling each of said strings from the outside ends of said members to disassemble said tool from the connection joint.

9. A method as defined in claim 1 further characterized by said tool having at least one longitudinally sliding part.

10. An apparatus having a central axis for aligning and butt connecting two tubular members to one another comprises:

a tool having a plurality of parts each of said parts having one side edge and an adjacent side edge;

the one side edge of one of said parts and the other side edge of another of said parts having corresponding shaped portions which interfit and are laterally slidable relative to one another such that when the one side edge and the other side edge of said parts are placed together the tool has a closed shape; and wherein said correspondingly shaped portions of said parts of said tool extend parallel to the central axis of said tool such that said parts slide relative to one another.

11. An apparatus as defined in claim 10 further characterized by providing on each of said parts a securement point adapted to be attached to string another similar device for removal of each of said parts from an internal confine.

12. An apparatus as defined in claim 11 further characterized by said parts of said tool being constructed totally or on its surface formed from a material which is incapable of being bonded to adhesive.

13. An apparatus as defined in claim 12 further characterized by said plurality of parts are about four in number each making up a portion of a side of a rectangular shape.

14. An apparatus as defined in claim 13 further characterized by each of said correspondingly shaped portions being comprised of a part having one side edge corresponding to a portion of the width dimension and a second edge corresponding to a portion of the height dimension and constructed such that when fit together the parts make a whole which has sides corresponding to the bonded.

15. A method as defined in claim 1 further characterized by providing said tool as a plurality of interconnected parts to make up a rectangular solid.

16. A method as defined in claim 15 further characterized by providing each of said plurality of interconnected parts with longitudinally extending mating members which are correspondingly sized and shaped to fit within corresponding members formed on the part to which one part is connected.

17. A method as defined in claim 16 further characterized by connecting each of said plurality of parts making up said tool to a string or similar device and connecting at least two of said plurality of parts to said string and waiting for said adhesive to cure and thereafter pulling each of said strings from the outside ends of said members to disassemble said tool from the connection joint.

18. A method as defined in claim 1 wherein said tubes are further coated internally with a metallic material to form a waveguide.

* * * * *

UNITED STATES PATENT AND TRADEMARK OFFICE
CERTIFICATE OF CORRECTION

PATENT NO.    : 6,398,902 B1                                             Page 1 of 1
DATED         : June 4, 2002
INVENTOR(S)   : Robins et al.

It is certified that error appears in the above-identified patent and that said Letters Patent is hereby corrected as shown below:

Column 6,
Line 30, "tubular member and portion of…" should read -- tubular member such that a portion of said tool extends into one tubular member and portion of… --.

Column 8,
Line 4, "whole which has sides corresponding to the bonded." should read -- whole which has sides corresponding to the height and width dimensions of the tubular members to be bonded. --.

Signed and Sealed this

Seventeenth Day of December, 2002

JAMES E. ROGAN
*Director of the United States Patent and Trademark Office*